United States Patent

[11] 3,572,946

[72] Inventor John C. Little
        Menlo Park, Calif.
[21] Appl. No. 802,541
[22] Filed Feb. 26, 1969
[45] Patented Mar. 30, 1971
[73] Assignee Sylvania Electric Products Inc.

[54] FLUID ANALYZER APPARATUS
    4 Claims, 3 Drawing Figs.

[52] U.S. Cl. .................................................. 356/181,
    356/183, 356/246
[51] Int. Cl. ..................................................... G01j 3/46,
    G01n 1/10
[50] Field of Search ......................................... 356/183,
    244—246, 188, 201; 250/220, SDS Primary Examiner—Ronald L. Wibert
Assistant Examiner—Conrad Clark
Attorneys—Norman J. O'Malley, Elmer J. Nealon and John F. Lawler ABSTRACT: A hollow cell with opposed windows is connected in series with conduits through which automobile exhaust gas to be analyzed flows continuously. A broadband infrared source directs a beam through the windows to a first photodetector which measures the absorption of light at one wavelength to which one of the gas components, such as carbon monoxide (CO), is responsive. This beam is alternately directed over a longer path through the cell by a reflective chopper wheel adjacent the exit window and by mirrors mounted outside both windows to another photodetector which measures absorption of light at a different wavelength corresponding to another component, such as a hydrocarbon (HC). The outputs of both photodetectors are utilized to give continuous direct readout of the concentrations of the components. Each window is formed with a length of transparent plastic tape releasably sealed against the cell body and connected to a roll of the tape mounted adjacent to the cell. A clean window is provided by simply advancing a fresh length of tape into the cell and discarding the used portion.

Patented March 30, 1971

INVENTOR.
JOHN C. LITTLE

BY John F. Lawler
ATTORNEY

INVENTOR.
JOHN C. LITTLE

BY John F. Lawler
ATTORNEY

FLUID ANALYZER APPARATUS

BACKGROUND OF THE INVENTION

This invention relates to fluid analyzers and in particular to improved apparatus for determining the concentration of known components in a fluid mixture by measuring absorption of light at predetermined wavelengths.

The analysis of multicomponent gases often requires measurement of the concentrations of two or more of the components at the same time. For example, in the measurement of automobile exhaust gases, it is desirable to know the concentration of carbon monoxide for measurement of engine performance as well as the amount of unburned or incompletely burned hydrocarbons, both of which are major contributors to air pollution. One technique of making such measurements is to determine the absorption or extinction of the light through a gas mixture according to Beer's law as follows:

$$I = I_o 10 \epsilon c^x$$

where $I$ is the intensity of light transmitted, $I_o$ is the intensity of the incident light, $\epsilon$ is the molar extinction coefficient, c is the concentration of fluid in moles per liter, and $X$ is the thickness of the transmitting layer. Also, it is known that carbon monoxide exhibits a measurable characteristic absorption of light energy at a wavelength of 4.66 microns, carbon dioxide at 4.34 microns and the methyl ($CH_3$) group of hydrocarbon at 3.43 microns. The latter group, $CH_3$ is used as a measure of unburned hydrocarbons present in automobile exhaust gas because most of the components of gasoline are characterized by C–H bonds which produce overlapping infrared absorptions in the 3.43 micron region. In addition, such components are present in exhaust gas in widely varying concentrations so that the difference in rates of absorption per unit of path length of the infrared beam through the sample is substantial. For example, $CH_3$ concentration is in the order of 1,500 parts per million (ppm) whereas the CO is present in the range of 30,000 to 50,000 ppm.

In order to accommodate these differences in gas components to be analyzed, prior art apparatus has provided different detector processing circuits or different sample cells or both. Such duplication and system complexity has added to the bulk and cost of analyzer equipment and has complicated its operation and maintenance.

An object of the invention is the provision of a compact low-cost fast-response optical gas analyzer system which utilizes a single cell for simultaneously determining the concentrations of a plurality of components of the gas.

Another practical problem experienced in spectral analysis of exhaust gases, especially with a continuous flow of such gas through the sampling cell, is the collection of residue on the windows of the cell due in part to gas components having low vapor pressures. Such residue tends to impede or even block the transmission of the beam through the cell and necessitates frequent dismantling, cleaning and reassembly of the cell. Such practice is awkward and time consuming and results in undesirable and costly interruptions of tests.

A further object of the invention is the provision of electro-optic gas analyzing equipment with cell windows that may be quickly and inexpensively replaced.

SUMMARY OF THE INVENTION

A compact single-cell system is used for continuously measuring the concentration of a plurality of chemical components in a fluid mixture, such as automobile exhaust gas, by measuring absorption by the respective gas components of infrared light at selected wavelengths. Exhaust gas components such as carbon monoxide and hydrocarbons exhibiting characteristic absorption at different wavelengths and being present in widely different concentrations are simultaneously measured by alternately directing a broadband infrared beam over different path lengths in the gas to photodetectors responsive to light at the selected wavelengths. Disposable quick-change cell windows are provided to prevent gas residue on the windows from affecting light transmission.

DESCRIPTION OF PREFERRED EMBODIMENT

Figure 1:
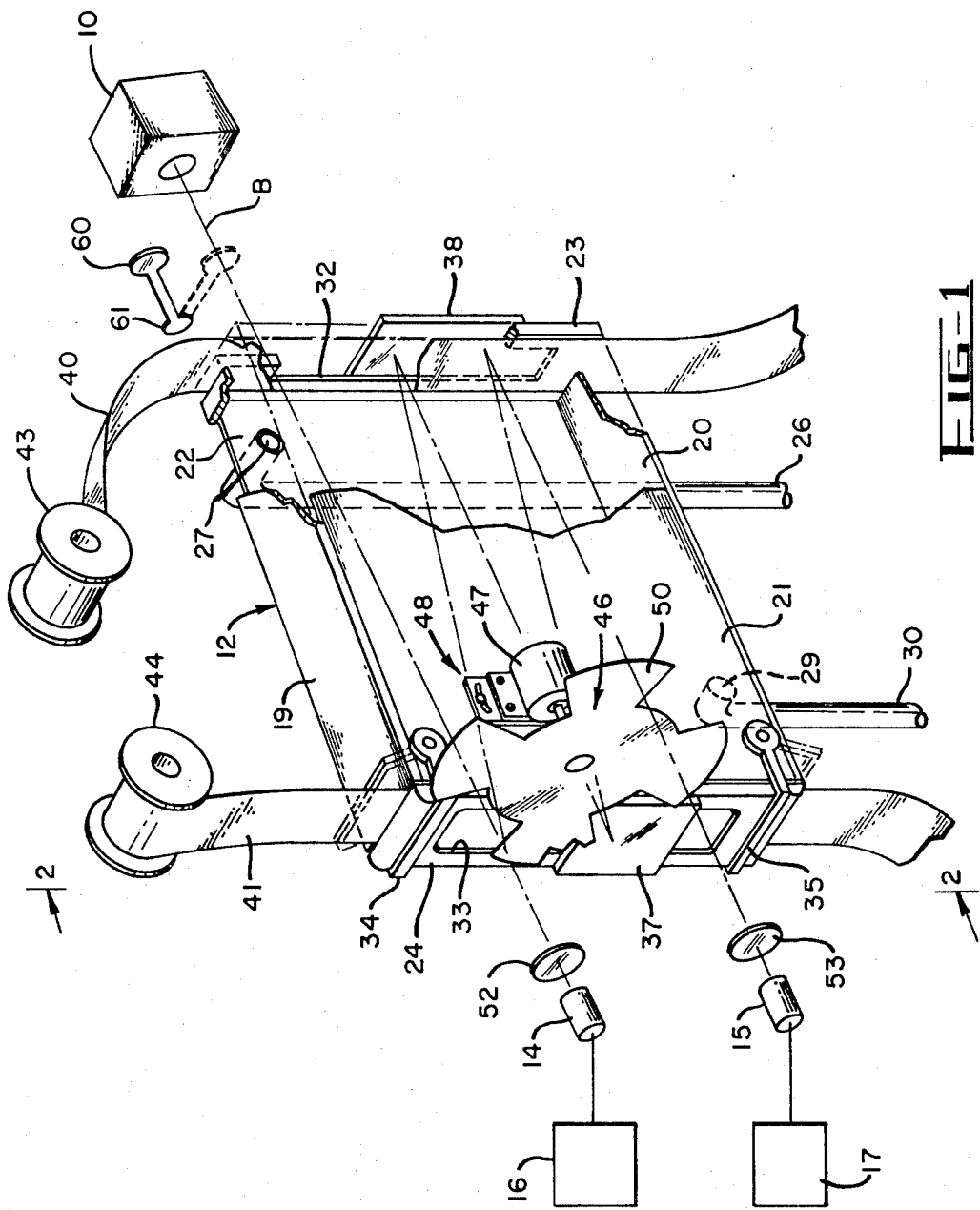
FIG. 1 is a perspective schematic view of a gas analyzer system embodying this invention.
Figure 2:
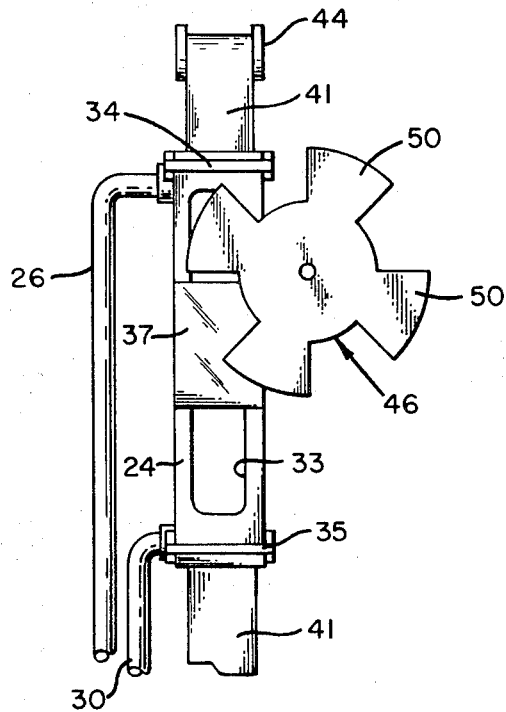
FIG. 2 is an end view of the cell of FIG. 1, the view being taken on line 2–2 of FIG. 1.

A gas analyzer system embodying the invention is shown in Fig. 1 and comprises a light source 10 which directs a beam B through a gas sample cell 12 to optical sensors 14 and 15 connected to utilization devices 16 and 17, respectively, such as meters or chart recorders. Source 10 preferably is a broadband infrared light generator, for example, one capable of producing useful light at wavelengths between 1 and 10 microns. Such a source 10 may be a unit of the type described in copending Ser. No. 878,291 assigned to the assignee of this invention.

Cell 12 has a rectangularly-shaped hollow body comprising top wall 19, bottom wall 20, front wall 21 and rear wall 22; end plates 23 and 24 are releasably secured to the cell body. Gas to be analyzed passes into the cell from input pipe 26 through port 27 in the upper corner (as viewed in FIG. 1) of rear wall 22 and exits at the diagonally opposite end of the cell through output port 29 to which pipe 30 is connected. Gas flows through the cell continuously and preferably at a constant temperature and pressure.

End plates 23 and 24 are substantially identical and have central elongated apertures 32 and 33, respectively, through which light passes into and out of the cell. In order to releasably hold each of the end plates on the cell, U-shaped clamps 34 and 35 are pivotally mounted on the front and rear walls 21 and 22 for vertical movement between the clamped position shown in solid line and the unclamped position shown in broken lines. A mirror 37 is mounted exteriorly of end plate 24 and covers part of aperture 33 and similarly mirror 38 is mounted on the exterior of end plate 23 over part of its aperture 32.

In order to seal the gas on the interior of the cell and yet permit the beam from source 10 to pass into and out of the cell, tapes 40 and 41 of flexible transparent plastic, such as .005 inch thick fluorinated ethylpropylene, are disposed between end plates 23 and 24, respectively, and the main body of the cell. Each tape is slightly wider than the plate aperture and hermetically seals the gas within the cell when the end plates are clamped against the cell body. Tape 40 extends from a supply reel 43 through the top of the cell and out the bottom as shown; tape 41 similarly extends from supply reel 44 through the cell. Thus the portions of the tapes which cover the plate apertures constitute cell windows which transmit light from source 10 without substantial absorption. When residue from the gas in the cell accumulates on these windows sufficiently to affect transmission of the infrared beam, the end plates are unclamped, a fresh length of tape is pulled from each reel into the cell, the plates are reclamped, and the dirty lengths of tape are severed and discarded.

In order to alternately direct light from source 10 to sensors 14 and 15, a chopper wheel 46 is disposed over aperture 33 in plate 24. Wheel 46 is driven by motor 47 mounted by universal adjusting bracket 48 on front wall 21. Peripherally spaced blades 50 on wheel 46 lie in a common plane and successively pass over aperture 33 to alternately reflect and pass light transmitted through the cell directly from source 10. Universal bracket 48 permits the position of wheel 46 to be adjusted in the X and Y planes to the desired angle for reflecting the light beam at the proper angle from its blades.

Sensor 14 is positioned to receive the light beam from source 10 after one pass through the cell; that is, sensor 14 receives the light beam when the spaces between wheel blades 50 are aligned with aperture 33. A band-pass optical filter 52 in front of sensor 14 blocks all light except that at a selected wavelength $\lambda_1$, where $\lambda_1$ equals 4.66 for measurement of CO.

Similarly, optical filter 53 in front of sensor 15 blocks all light except that at wavelength $\lambda_2$ where $\lambda_2$ is 3.43 microns for $CH_3$.

Figure 3:
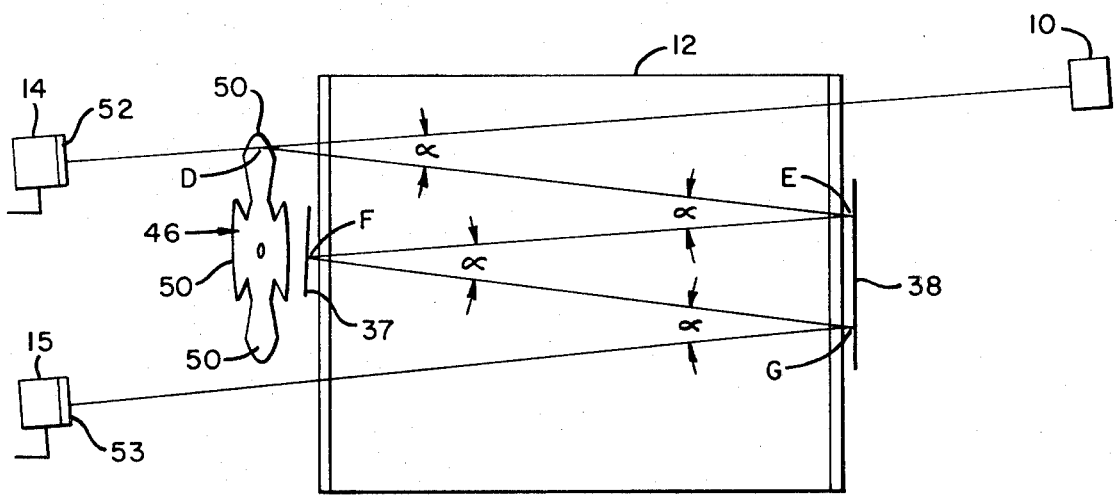
FIG. 3 is a simplified schematic plan view of the system showing the paths of the light beam through the cell.

In one embodiment of the invention, the light beam reflected from point D on wheel blades 50 at an angle $\alpha$, see FIG. 3, passes back through the gas sample in the cell for reflection from mirror 38 at point E downward at the same angle $\alpha$. This light beam passes a third time through the gas sample, is reflected from point F on mirror 37 at the same downward angle $\alpha$ to mirror 38 from point G on which it is again reflected at angle $\alpha$ for the fifth pass through the sample and emerges through window 41 below mirror 37 for reception by sensor 15.

In operation, gas to be analyzed is conducted into the cell from pipe 26 and out of the cell through pipe 30. Motor 47 is energized and wheel 46 is rotated at a given angular velocity $\omega_o$. Light passes alternately to sensor 14 when the spaces between blades 50 are aligned with beam B and to sensor 15 when blades 50 reflect the beam B back through the cell. Band-pass filters 52 and 53 permit the respective sensors 14 and 15 to receive only wavelengths $\lambda_1$ and $\lambda_2$, respectively, and thus measure only those constituents of the gas identified with those wavelengths. Since the concentration of the hydrocarbon component $CH_3$ is much less than that of CO, the length of the beam in the sample required to measure $CH_3$ is substantially longer than that for measuring carbon monoxide. Accordingly the infrared beam is reflected several times through the gas sample to facilitate this measurement.

Bracket 48 is designed to permit angular adjustment of the plane of wheel 46 for reflecting beam B into the cell at the proper angle. Similarly, mirrors 37 and 38 are adjustably mounted on the end plates to produce the desired angle of reflection of the beam.

Calibration of readout devices 16 and 17 is accomplished with an optical attenuator 60, see FIG. 1, when fresh air (neutral sample) is circulated through the cell. Attenuator 60 is supported on pivot mounting 61 adjacent to source 10 for movement between a nonoperating or standby position offset from beam B as indicated in solid lines and an operating or calibration position in alignment with beam B as indicated in broken lines. The optical design of attenuator 60 is such as to simulate attenuation of light by a known quantity or concentration of CO and $CH_3$. Meters 16 and 17 are then adjusted to read these known concentrations and the calibration is complete. Attenuator 60 is then moved to the standby position, pipe 26 is connected to source of gas to be analyzed and the apparatus is ready for use.

I claim:

1. An electro-optical fluid analyzer comprising:
    a cell having at least one window in contact with the fluid to be analyzed;
    optical transmitting means oriented to direct a light beam into said cell;
    electro-optical receiving means responsive to said light beam passing from said cell for measuring changes incident to propagation through fluid in the cell;
    said window being disposed in the path of said light beam and comprising one portion of length of transparent material having other portions extending exteriorly of the cell.

2. The analyzer according to claim 1 in which said material is a tape of transparent plastic.

3. The analyzer according to claim 2 with a supply roll of said tape supported adjacent to said cell.

4. The analyzer according to claim 3 in which said cell has a main body, a plate having an elongated aperture releasably clamped to said cell body, said one portion of the tape being sealed by said plate against said cell body and covering said plate aperture.